(12) United States Patent  
Borders

(10) Patent No.: US 7,127,931 B1
(45) Date of Patent: Oct. 31, 2006

(54) TANDEM PRESS SHUTTLE AREA ISOLATION GATE SYSTEM AND METHOD OF USE

(75) Inventor: Brian K Borders, Jacksonville, AL (US)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 10/996,499

(22) Filed: Nov. 23, 2004

(51) Int. Cl.
*B21D 43/05* (2006.01)
*F16P 1/00* (2006.01)

(52) U.S. Cl. .................. 72/404; 72/405.01; 100/349; 192/134; 74/608

(58) Field of Classification Search .................. 72/404, 72/455, 405.01; 192/134; 100/349, 350; 74/608, 612; 83/397, 397.1
See application file for complete search history.

(56) References Cited

U.S. PATENT DOCUMENTS

| | | | |
|---|---|---|---|
| 2,683,515 A * | 7/1954 | Horn et al. .................. 192/134 |
| 3,641,841 A * | 2/1972 | Komori ....................... 74/615 |
| 3,877,859 A | 4/1975 | Grazine |
| 3,912,061 A | 10/1975 | Foster, Jr. |
| 3,913,413 A | 10/1975 | Walker |
| 3,996,815 A | 12/1976 | Walker |
| 4,102,174 A * | 7/1978 | Blase .......................... 72/421 |
| 4,398,435 A | 8/1983 | VanSice et al. |
| 4,498,567 A | 2/1985 | Aultz et al. |
| 4,597,698 A | 7/1986 | Liebetrau |
| 4,687,088 A | 8/1987 | Babel |
| 4,870,592 A | 9/1989 | Lampi et al. |
| 5,047,752 A | 9/1991 | Schorn |
| 5,150,451 A | 9/1992 | Deplano |
| 5,265,497 A | 11/1993 | Curless |
| 5,337,594 A * | 8/1994 | Pettersson et al. ............ 72/446 |
| 5,643,477 A | 7/1997 | Gullo et al. |
| 5,703,452 A | 12/1997 | Futsuhara |
| 5,760,560 A | 6/1998 | Ohya et al. |
| 5,836,064 A | 11/1998 | Winkler et al. |
| 6,325,195 B1 | 12/2001 | Doherty |

* cited by examiner

*Primary Examiner*—Daniel C. Crane
(74) *Attorney, Agent, or Firm*—Standley Law Group LLP

(57) ABSTRACT

The present invention is directed to a tandem press shuttle area isolation gate system and its method of use. The system and method of the present invention allows workers to safely enter the shuttle areas between tandem presses concurrently with a die change, thereby facilitating a quicker changeover of a tandem press line and a reduction in downtime. The system and method of the present invention employs safety gates to isolate the work envelope of each press from the shuttle areas during a die change. In this manner, workers can safely operate in the shuttle areas without the risk of contacting moving dies or bolsters that are being transferred to or from the presses.

31 Claims, 7 Drawing Sheets

TANDEM PRESS SHUTTLE AREA ISOLATION GATE SYSTEM AND METHOD OF USE

BACKGROUND OF THE INVENTION

The present invention is directed to a system and method for isolating the shuttle area of a press during a die change operation. More particularly, the present invention is directed to a system and method for isolating the shuttle area existing between tandem presses so that an operator can safely work in the shuttle area during an ongoing die change.

Presses and die sets are commonly used in various manufacturing processes to form, trim, or pierce components, typically metal components. For example, die sets may be used to blank, form and trim numerous automotive components, which are subsequently assembled into an automobile. Depending on the particular component to be formed or altered, a single die and press may be employed, or several related dies located in a series of presses may be used.

The use of multiple dies in multiple presses is generally required when forming components with complex geometries. Such a process is often referred to as a tandem press operation, because the presses associated therewith are typically arranged in tandem such that the exit side of one press can feed the entry side of a subsequent, adjacent press. Thus, a tandem press line is formed. Such a process is often also referred to as a progressive die (prog-die) operation, because the component of interest is progressively created as it passes from the first die to the last die.

In a tandem press line, the space between adjacent presses is typically used as a shuttle area. More specifically, this space is usually occupied by component transfer equipment such as shuttle tables and/or part handlers that function to transfer the in-process component from one die to the next. For example a part unloader may be provided to remove a part from a first die and load the part onto a shuttle table. The shuttle table then advances toward the next press, where a part loader removes the component and places it on the die located therein. There may be several individual sets of component transfer equipment, depending on how many presses are used in the process.

It is also common for such tandem press operations to produce a plurality of different components. For example, a tandem press line in an automobile manufacturing facility may be used to produce hoods, trunks, fenders, door skins, and various other body components. In addition to the various dissimilar body components that may be produced by such a tandem press operation, it is also common to produce such components for more than one vehicle. Thus, as can be understood, such a tandem press line will typically have a multitude of different dies associated therewith.

When switching the manufacturing operation from one component to another, it is typically required to replace the die in each press. To this end, most tandem press lines employ some type of die change system, whereby current dies can be removed from each press and new dies installed thereto. Preferably, tandem press lines employ automatic die change systems, such as systems wherein the dies are moved into and out of the presses on rolling bolsters. During an automatic die change, the dies to be replaced are released by the clamping devices of their respective presses. Since these dies are also affixed to sliding bolsters, the new dies can be moved into the presses while the old dies are simultaneously moved out.

Just as the process of manufacturing dissimilar components requires the use of different dies, it also normally requires the use of different component transfer equipment. Consequently, in conjunction with a die change, it is typically necessary to also change part handler arms, shuttle table jigs, and/or other similar items. This process must normally be performed after the die change process has been completed, as it would be unsafe to allow workers into the press area while the dies and bolsters are moving into position.

Because the dies that are used in such tandem press operations can be quite large, it generally takes several minutes to complete a die change even if an automatic die change system is used. To this die change time must then be added the time required to convert the associated component transfer equipment; which generally must be accomplished by hand. As such, an overall changeover of the tandem press line can frequently take approximately five minutes or more, even with multiple workers assigned to the task.

As can be appreciated, especially with respect to a high volume manufacturing operation, lost production time generally equates to lost profits. Initially, five minutes of downtime may not seen significant. However, when it is realized that several changeovers may be required per shift of a multiple-shift manufacturing operation, and that such an operation may run hundreds of days per year, it can be understood that the accumulated downtime may be significant. For example, a tandem press line running three shifts per day, 260 days per year, with on average three, five minute changeovers per shift, will have a total yearly downtime of approximately 11,700 minutes, or 195 hours—not insignificant by any means.

SUMMARY OF THE INVENTION

To this end, it is desirable to reduce the downtime associated with performing such a changeover. It is also desirable that any system and/or process provided to reduce this downtime not jeopardize the safety of workers assigned to the changeover operation. The system and method of the present invention is able to satisfy both of these requirements.

The system and method of the present invention locates safety gates on the entry and/or exit sides of the presses used in a tandem press line, thereby permitting workers to change component transfer equipment simultaneously with a die change. For example, a first and last press in such a press line may have only an exit side and entry side gate, respectively. However, each press located in between the first and last press would have a safety gate on both the entry and exit side thereof. These gates would be maintained in a normally open position during press operation. That is, these safety gates would be preferably maintained in a raised position during normal press operation so as not to interfere with the component transfer equipment operating in the shuttle area between adjacent presses. These safety gates would also work in conjunction with other safety gates common to such tandem press lines. Thus, for example, during press operation both the work area within each press and the shuttle area between adjacent presses would be guarded by normally closed safety gates. However, during a changeover, the normally closed safety gates would be opened while the normally open safety gates between adjacent presses would be closed. Such an arrangement and manipulation of safety gates makes it safe for workers to change component transfer equipment simultaneously with a die change because they are shielded from contact with the moving bolsters and dies. When the changeover is completed, all the safety gates are returned to their normal positions in preparation for press operation.

The safety gates may be manufactured from any of multiple materials, such as steel or aluminum, for example. The safety gates may be of any of various designs such as, for example, a plurality of spaced bars or a framework surrounding a sheet of expanded metal or plexiglass. In any event, the safety gates should comply with all applicable safety regulations.

It is contemplated that the safety gates may be raised and lowered into their operating and changeover positions, respectively. However, depending on the design of the tandem press line, it may also be possible for the safety gates to be moved into position in a horizontal direction. The safety gates may be positioned by any of various actuators such as, for example, a winch and cable, a hydraulic or pneumatic cylinder, or a linear actuator mechanism.

Each of the safety gates may be operated in conjunction with other safety devices. For example, additional guarding devices, such as photo eyes, light curtains, and/or pressure sensitive safety mats, may also be employed. It should be further understood that operation of the entry and exit side safety gates may be interlocked with the tandem press line control system to ensure that these safety gates are positioned appropriately during press operation and changeover, and that operation thereof occurs at the appropriate time.

As a result of using the system and method of the present invention, the total time to perform a changeover may be significantly reduced. For example, the total time to perform a changeover may be cut by approximately 50% or more. Consequently, use of the system and method of the present invention can lead to a significant cost savings while concurrently ensuring worker safety.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
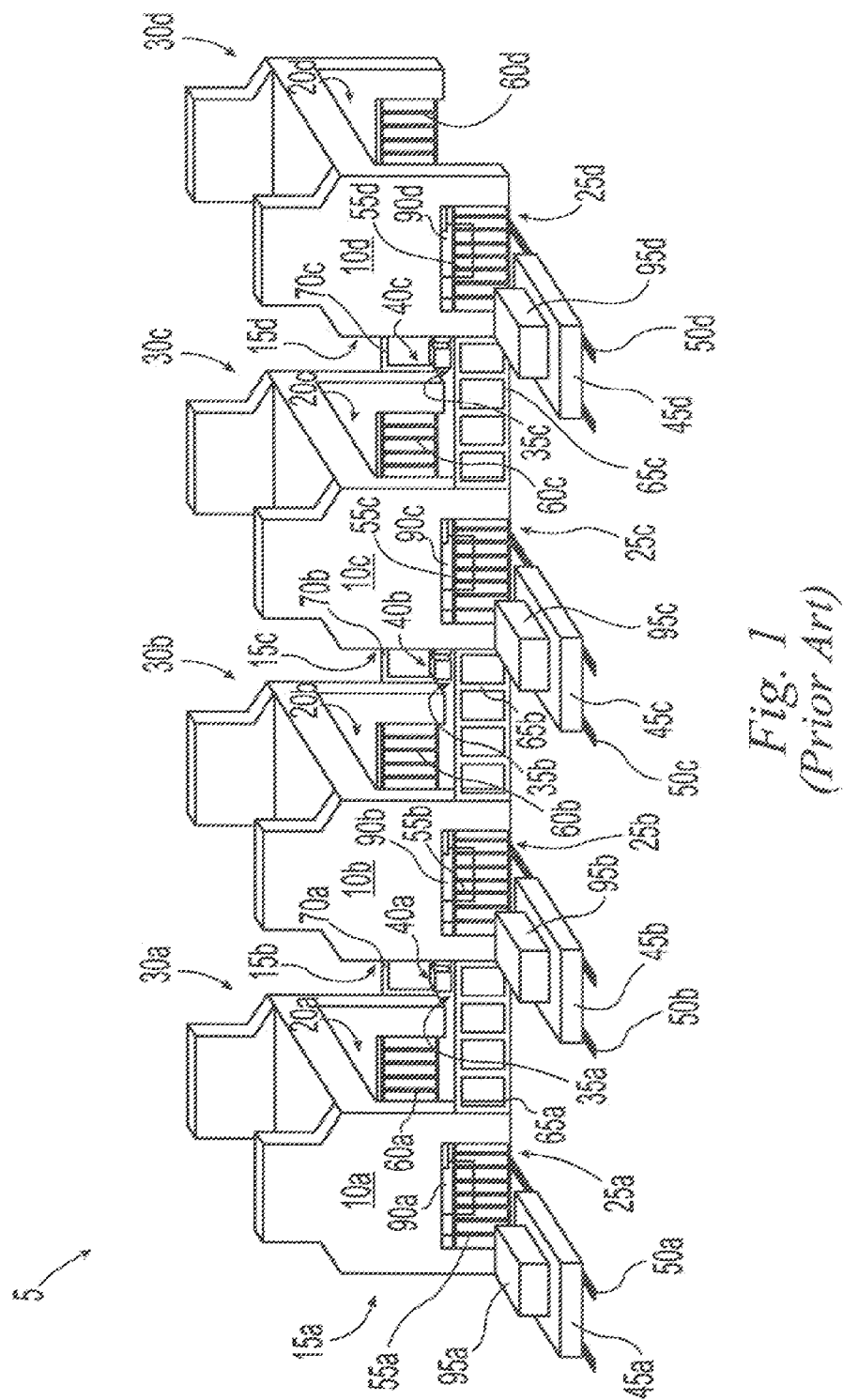
FIG. 1 is a perspective view illustrating a typical four-press tandem press line with existing safety gates in their operating positions and a number of die carrying bolsters awaiting transfer into the presses.
Figure 2:
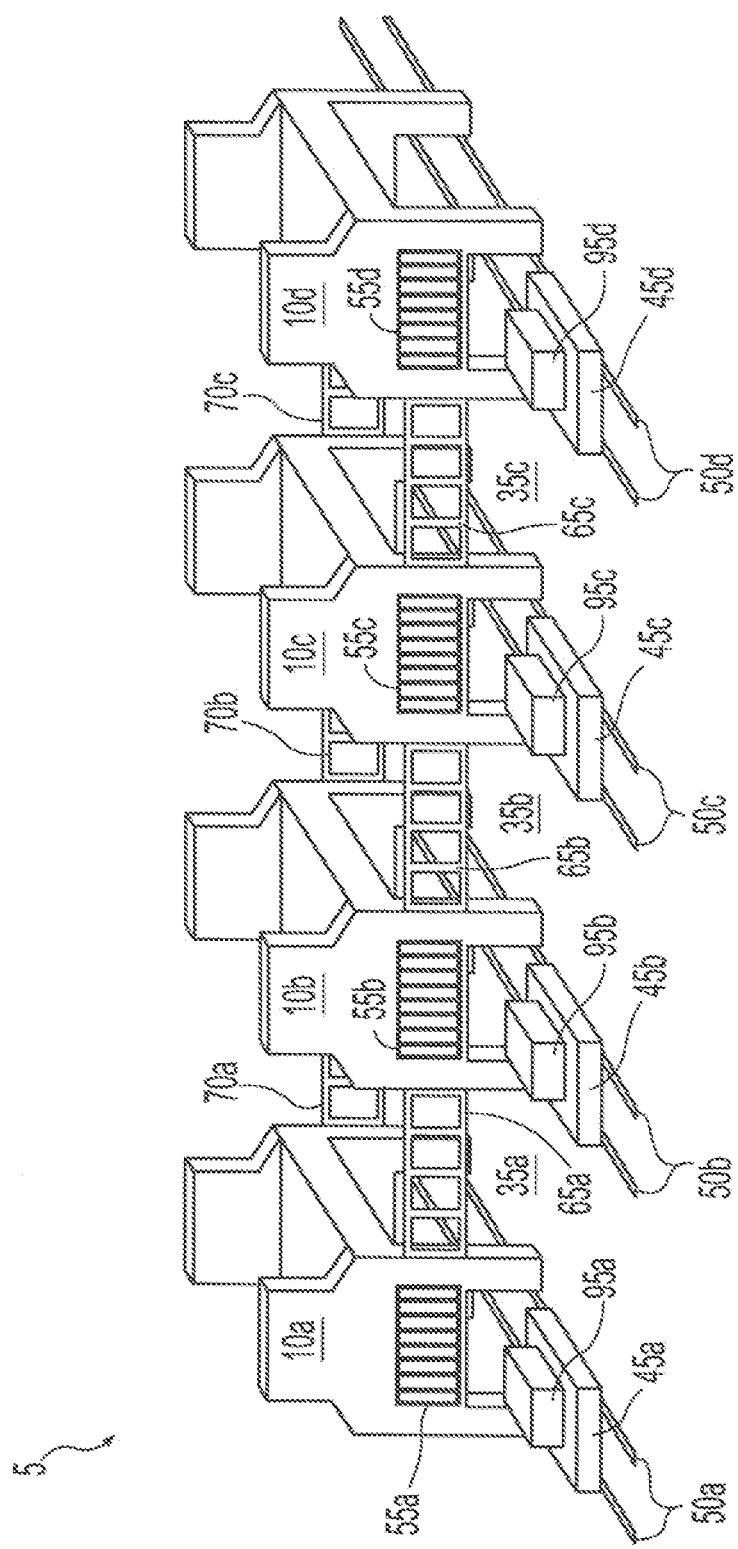
FIG. 2 is a perspective view illustrating the tandem press line of FIG. 1 with the existing safety gates in their die change positions and a number of die carrying bolsters being transferred into the presses.
Figure 3:
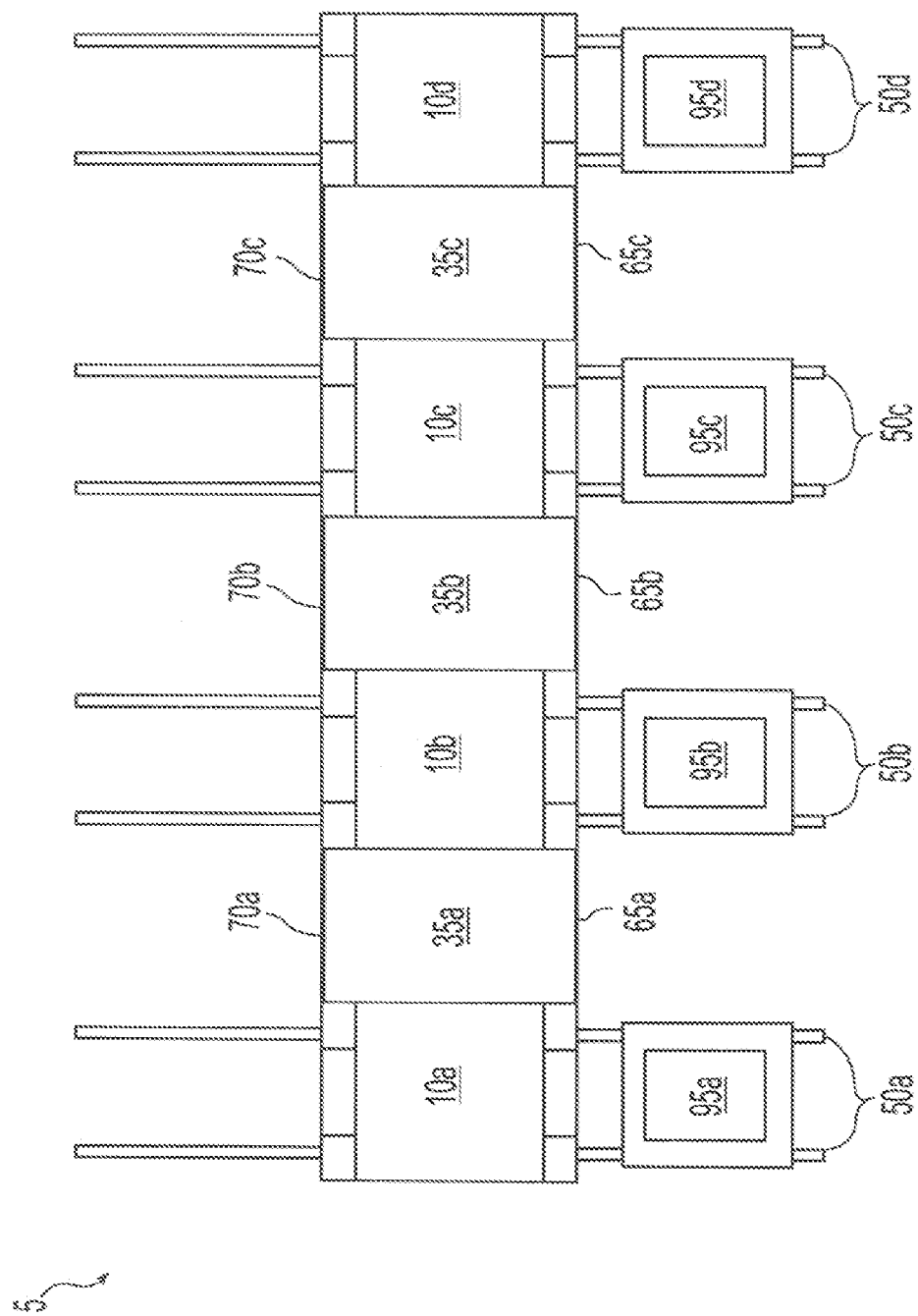
FIG. 3 is a top plan view of the tandem press line of FIGS. 1 and 2.

A typical tandem press line 5 is depicted in FIGS. 1–3. As can be observed, this particular tandem press line 5 has four individual presses 10a–10d—although it should be realized that virtually any number of presses may be associated therewith. In this particular example, component flow moves from left to right through each of the presses 10a–10d and an associated die 90a–90d installed thereto.

Each press 10a–10d of this particular tandem press line 5 can be understood to have opposed entry and exit sides 15a–15d, 20a–20d (via which components are received and ejected, respectively), and opposed die transfer sides 25a–25d, 30a–30d (via which dies are loaded and removed). The presses 10a–10d are arranged such that an exit side of an upstream press is adjacent to an entry side of a downstream press. Shuttle areas 35a–35c reside between the adjacent presses: a first shuttle area 35a between the first press 10a and the second press 10b; a second shuttle area 35b between the second press 10b and the third press 10c; and a third shuttle area 35c between the third press 10c and the fourth press 10d. Shuttle areas may also exist at the entry side 15a of the first press 10a, and the exit side 20d of the last press 10d, although for the purpose of simplicity, such is not discussed in detail herein.

Each shuttle area 35a–35c is occupied to some extent with a corresponding set of component transfer equipment 40a–40c. Component transfer equipment may also reside in the additional shuttle areas at the entry side 15a of the first press 10a and the exit side 20d of the last press 10d, as referred to above. The component transfer equipment 40a–40c is designed to move an in-process component from press-to-press along the tandem press line 5.

This particular tandem press line 5 is provided with an automatic die change system that employs rolling bolsters 45a–45d. The rolling bolsters 45a–45d are used to transport dies into, and out of, the respective die transfer sides 25a–25d, 30a–30d of each press 10a–10d. The rolling bolsters 45a–45d are guided into and out of each press 10a–10d by a set of rails 50a–50d that are embedded into the floor. The rails 50a–50d are arranged to direct the bolsters 45a–45d and dies along a linear path through each press 10a–10d, and generally extend outward from each press a sufficient distance to allow for storage of a bolster and die without interfering with press operation. During a die change operation, the dies 90a–90d currently in the presses 10a–10d are transported by their associated rolling bolsters (not visible) along the guide rails 50a–50d and out of one die transfer 30a–30d side of each press, while new dies 95a–95d are simultaneously transported by the rolling bolsters 45a–45d into the presses from the opposite die transfer side 25a–25d thereof.

Press envelope safety gates 55a–55d, 60a–60d are typically provided to restrict access to each press 10a–10d during press operation. A press envelope safety gate 55a–55d, 60a–60d is normally located on both die loading sides 25a–25d, 30a–30d of each press. During press operation these press envelope safety gates 55a–55d, 60a–60d are in a normally closed (down) position, thereby preventing workers from entering the work envelope of each press 10a–10d. In contrast, during a die change operation these press envelope safety gates 55a–55d, 60a–60d are opened (raised) to allow the rolling bolsters 45a–45d and dies 90a–90d, 95a–95d to be transported into and out of the presses 10a–10d. Additional guarding (not shown) may also be provided around the sets of rails 50a–50d to further prevent worker contact with moving dies 90a–90d, 95a–95d and bolsters 45a–45d.

Shuttle area safety gates 65a–65c, 70a–70c are similarly provided in this particular tandem press line 5 to prevent access to the shuttle areas 35a–35c during press operation. Such shuttle area safety gates 65a–65c, 70a–70c could also extend around any component transfer equipment that resides on the outside of the first and last press 10a, 10d. During press operation these shuttle area safety gates 65a–65c, 70a–70c are in a normally closed (down) position, thereby preventing workers from entering the shuttle areas 35a–35c between each press 10a, 10d. During a die change operation, these shuttle area safety gates 65a–65c, 70a–70c are eventually opened (raised) to allow workers access to the various component transport equipment 40a–40c.

The specific type of component transfer equipment 40a–40c will generally vary with the process performed and the particular component produced by the tandem press line 5. Typically, the component transfer equipment 40a–40c will consist of part handlers (such as overhead robotic manipulators), shuttle tables, and/or other similar devices. Because a die change is normally performed in preparation for the production of a different component, the component transfer equipment 40a–40c must generally be changed as well. For example, new handling arms may be affixed to the part handlers, and part jigs on the shuttle tables may be replaced.

Because of the risk to worker safety, however, this process must normally be performed after the actual die change process has been completed. More specifically, as can be best observed in FIGS. 1–2, it would be unsafe to allow workers into the press operating area while the dies 90a–90d, 95a–95d and bolsters 45a–45d are moving into position. And, once the shuttle area safety gates 65a–65c, 70a–70c are raised, there is no other safety feature associated with known tandem press lines to prohibit a worker from entering the path of the moving dies 90a–90d, 95a–95d and bolsters 45a–45d via the entry side 15a–15d or exit side 20a–20d of a given press 10a–10d.

Thus, in the interest of safety, the changeover of component transfer equipment 40a–40c that commonly occurs in conjunction with a die change must usually be delayed until the actual changing of the dies 90a–90d, 95a–95d has been completed. Only at that time will the shuttle area safety gates 65a–65c, 70a–70c normally be raised to allow workers access to the shuttle areas 35a–35c. Consequently, as discussed previously, valuable time is lost during each changeover because workers cannot convert the component transfer equipment 40a–40c concurrently with a changing of the dies 90a–90d, 95a–95d.

The system of the present invention and its method of use, eliminates the need to wait for the completion of a die change prior to allowing workers access to the shuttle areas 35a–35c associated with a typical tandem press line 5. As can be observed in FIGS. 4–6, the system and method of the present invention provides for the use of transfer area safety gates 75a–75c, 80a–80c in addition to the use of press envelope safety gates 55a–55d, 60a–60d and shuttle area safety gates 65a–65c, 70a–70c.

During press operation, transfer area safety gates 75a–75c, 80a–80c are in a normally open position, so as not to interfere with the normal flow of components through the tandem press line 5. During a changeover, however, the transfer area safety gates 75a–75c, 80a–80c are closed (lowered), which acts to prevent access to the work envelope of each press 10a–10d via an associated shuttle area 35a–35c. Consequently, use of the system and method of the present invention allows the shuttle area safety gates 65a–65c, 70a–70c to be opened during the die change operation without exposing workers to the risk of contact with one of the moving bolsters 45a–45d and/or dies 90a–90d, 95a–95d. As such, workers may enter the shuttle areas 35a–35c to convert the component transfer equipment 40a–40c therein concurrently with an ongoing die change operation.

As can be understood from the foregoing disclosure, allowing workers to convert the component transfer equipment 40a–40c concurrently with an ongoing die change can significantly reduce the amount of downtime normally associated with a typical tandem press line. Because a die change operation can often take several minutes, even with an automated die change system, downtime can be reduced by at least several minutes per changeover. The total amount of downtime saved will, of course, depend on the actual die change time and the number of changeovers experienced by a particular tandem press line.

The design of the transfer area safety gates 75a–75c, 80a–80c may be similar to, or different from that of the press envelope safety gates 55a–55d, 60a–60d and shuttle area safety gates 65a–65c, 70a–70c. For example, the transfer area safety gates 75a–75c, 80a–80c may be constructed of a plurality of spaced-apart tubular metal bars, or may take the form of a metal framework surrounding a section of expanded metal or plexiglass. The transfer area safety gates 75a–75c, 80a–80c may also be designed to fit around various types of component transfer equipment when in a closed position, while still maintaining the isolation of the press work envelopes from the associated shuttle areas 35a–35c. To this end, each transfer area safety gate 75a–75c, 80a–80c may actually consist of more than one individual gate. In any event, the design of the transfer area safety gates 75a–75c, 80a–80c must safeguard workers from contact with bolsters 45a–45d and dies 90a–90d, 95a–95d moving into and out of each press 10a–10d, and should comply with other existing safety regulations.

Figure 4:
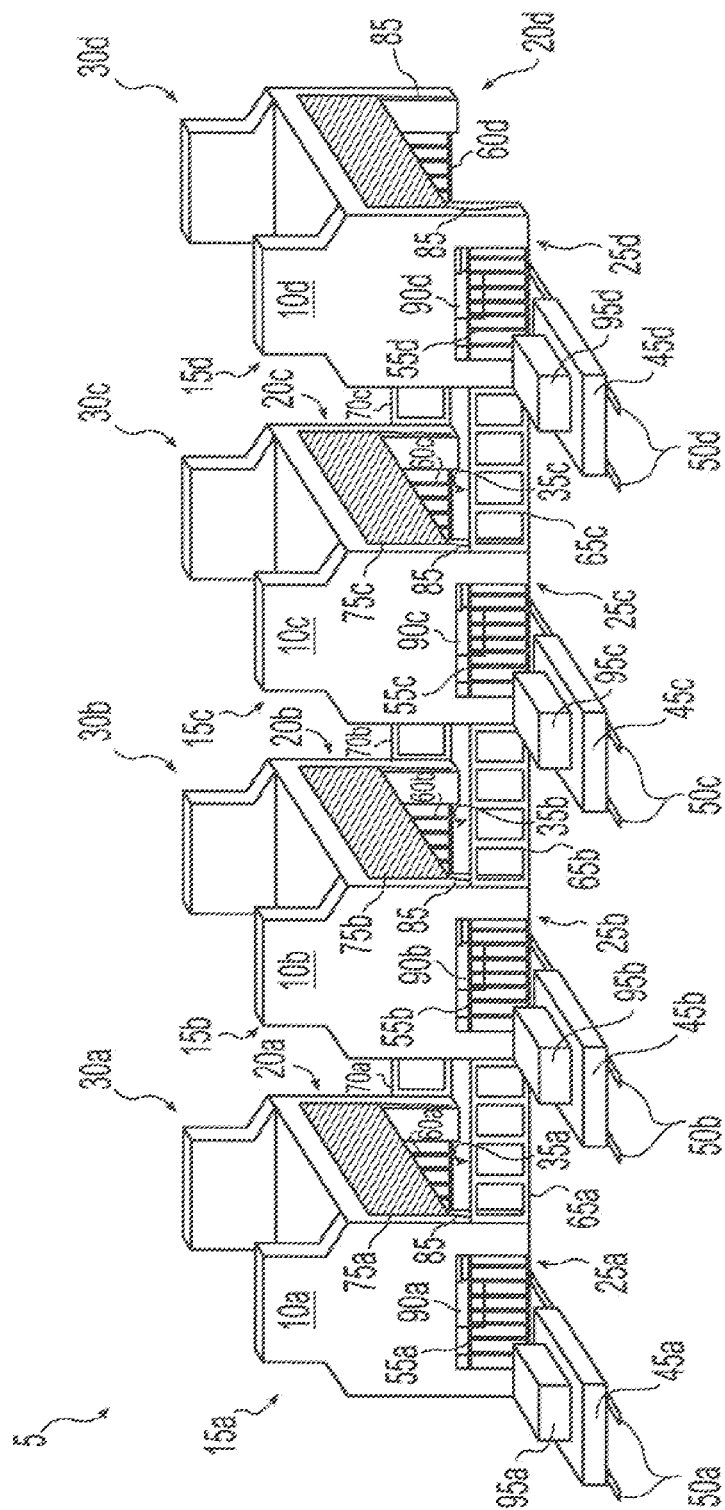
FIG. 4 shows the tandem press line of FIG. 1 with additional safety gates according to one embodiment of the present invention installed thereto and in an operating position.

The normally open position of the transfer area safety gates 75a–75c, 80a–80c is shown in FIG. 4 to be a position residing above the entry or exit sides 15a–15d, 20a–20d of the presses 10a–10d. Thus, in this particular example, the transfer area safety gates 75a–75c, 80a–80c are slidably displaced along a vertical path. It should be realized, however, that depending on the tandem press line of interest and its associated shuttle areas and component transfer equipment, the transfer area safety gates 75a–75c, 80a–80c could also be rotated or otherwise moved between open and closed positions. It should also be realized that, depending on the tandem press line of interest and its associated shuttle areas and component transfer equipment, it may also be possible to move the transfer area safety gates along a sliding or rotating horizontal path.

Figure 5:
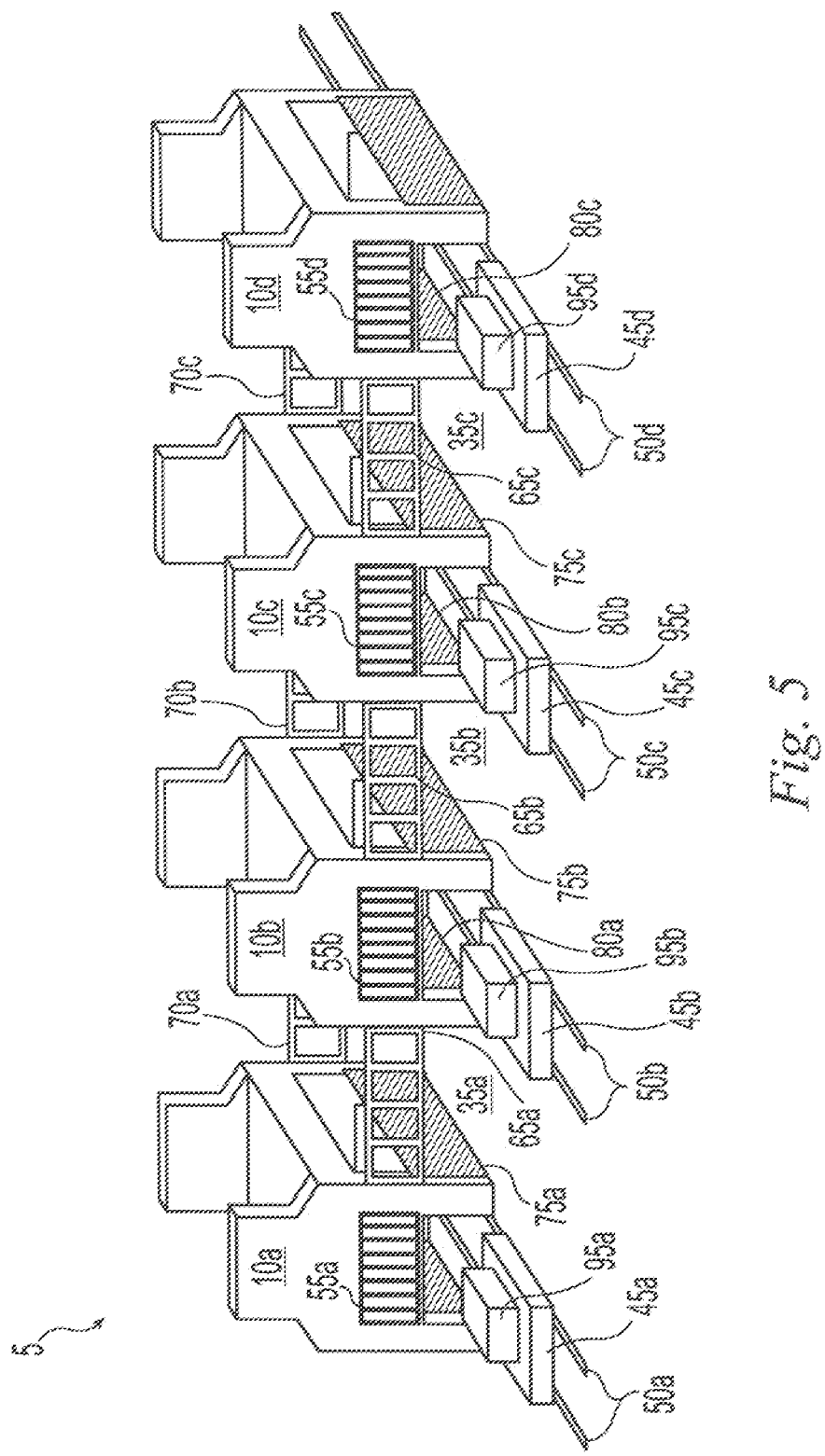
FIG. 5 is a perspective view illustrating the tandem press line of FIG. 2 with the additional safety gates installed thereto and in a die change position.
Figure 6:
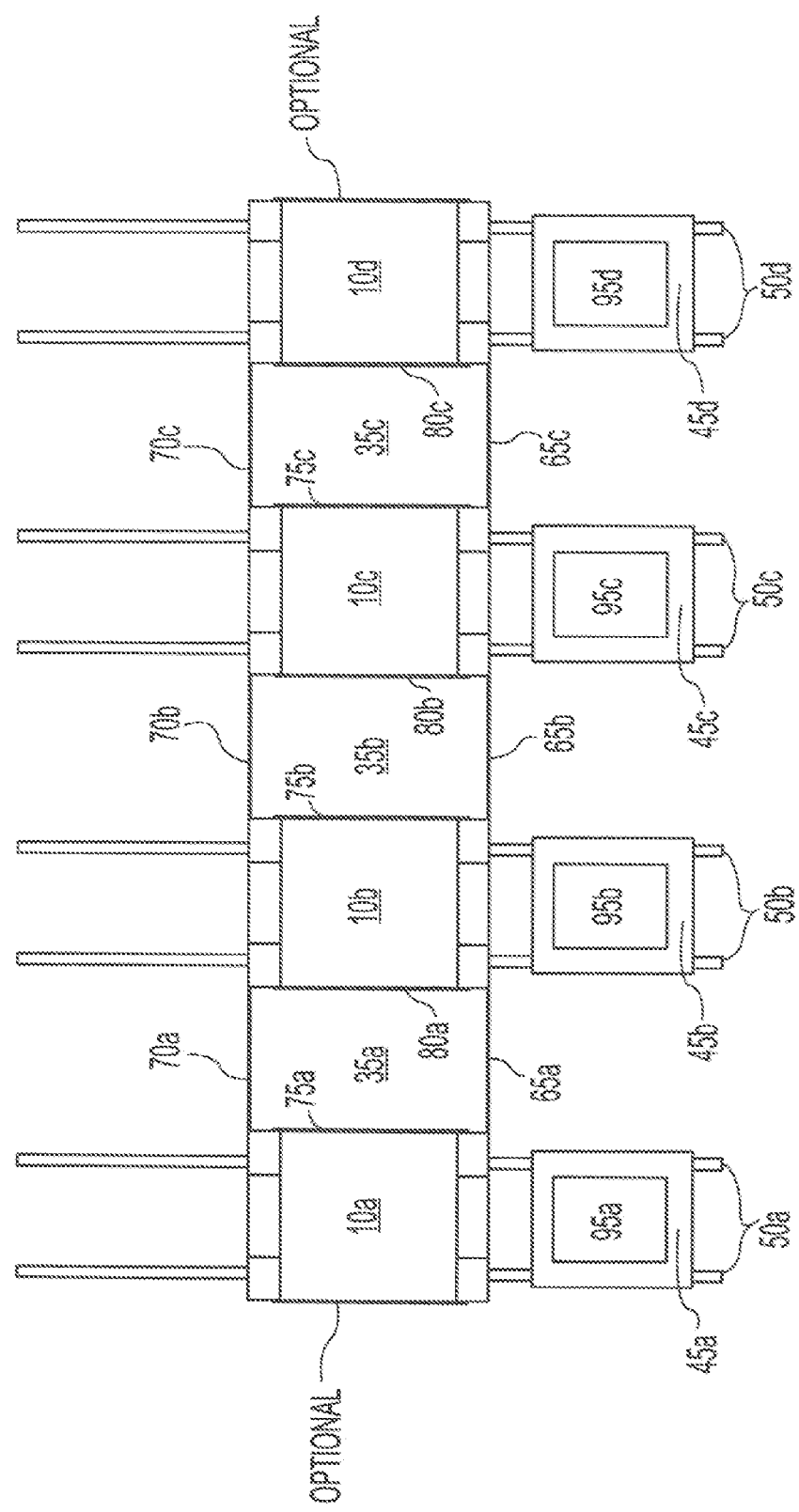
FIG. 6 is a top plan view of the tandem press line of FIGS. 4 and 5 from which it can be better understood how the shuttle area between adjacent presses is isolated from the moving bolsters by the additional safety gates.

In the exemplary embodiment of the present invention depicted in FIGS. 4–6, pairs of guide rails 85 are provided to direct the movement of each transfer area safety gate 75a–75c, 80a–80c. The guide rails 85 may be mounted to the frames of the respective presses 10–10d, may be mounted to other structures, or may be freestanding. In any case, the guide rails 85 should be located so as not to interfere with operation of the component transfer equipment 40—40c.

Movement of the transfer area safety gates 75a–75c, 80a–80c shown in FIGS. 4–6 between an open and closed position is accomplished via an electric winch and cable. However, such movement could also be accomplished by virtually any type of known actuator means. For example, a hydraulic or pneumatic cylinder could be used to move the transfer area safety gates 75a–75c, 80a–80c, or the transfer area safety gates could be transferred between positions via a motor-driven ball screw. The use of all such actuators is considered within the scope of the present invention.

Obviously, for safety reasons it must be ensured that safety gate operation be properly sequenced. More particularly, during a die change operation, it must be ensured that the transfer area safety gates 75a–75c, 80a–80c are closed prior to opening the shuttle area safety gates 65a–65c, 70a–70c and allowing workers to enter the shuttle areas 35a–35c. To this end, it is preferred that operation of the safety gates be interlocked with the die change and/or press line control system. In this manner, it can be made certain that particular predetermined conditions have been met prior to safety gate operation, and that the safety gate operating sequence occurs in the proper order.

In order to further enhance worker safety, each of the safety gates may also be operated in conjunction with other safety devices. For example, additional guarding devices, such as photo eyes, light curtains, and/or pressure sensitive safety mats, may also be employed. These additional safety devices may also be interlocked with the die change and/or press line control system.

Figure 7:
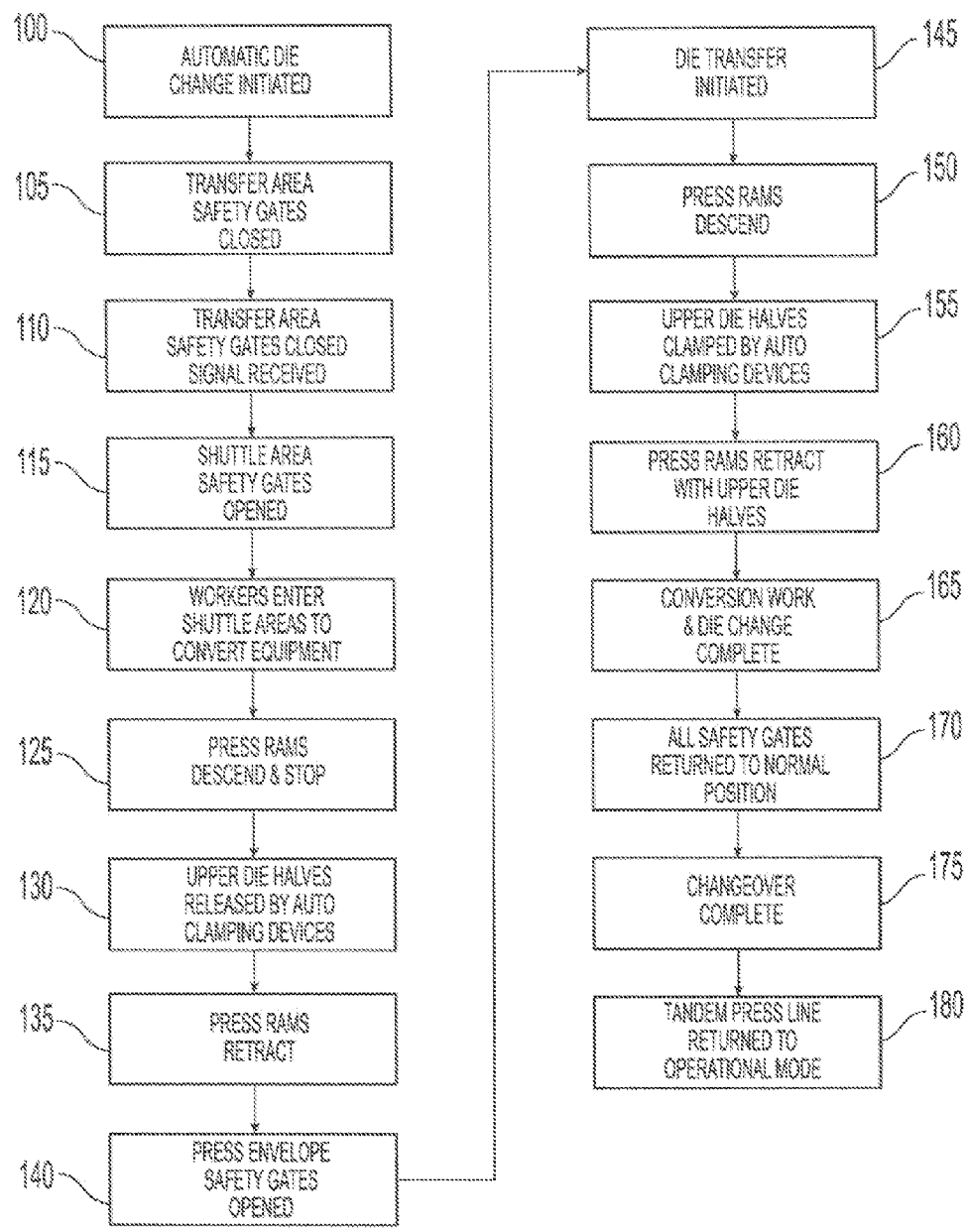
FIG. 7 is a flow diagram describing the steps of performing a changeover according to an exemplary method of the present invention.

The individual steps of using an exemplary method of the present invention during a changeover can be observed by reference to the flow diagram of FIG. 7. Once the last of a particular component has been passed through the tandem press line 5, an operator presses a button or otherwise initiates the automatic die change process 100. Once the automatic die change process has been initiated, the transfer area safety gates 75a–75c, 80a–80c are closed (lowered) 105, such that the work envelope of each press 10a–10d is segregated from an associated shuttle area 35a–35c. When the transfer area safety gates 75a–75c, 80a–80c are fully closed, a signal may optionally be sent 110, such as by a limit switch or a similar device, indicating the closed position of each transfer area safety gate. If one or more of the transfer area safety gates 75a–75c, 80a–80c does not fully close, the remainder of the changeover process with respect to the entire press line or, alternatively, with respect to only the affected presses of the press line, may be halted until the malfunctioning gates can be closed.

Assuming that all of the desired transfer area safety gates 75a–75c, 80a–80c have closed, the shuttle area safety gates 65a–65c, 70a–70c are then opened 115. Workers may thereafter enter the shuttle areas 35a–35c to begin the conversion of the component transfer equipment 40a–40c located therein 120.

Substantially concurrently with closure of the transfer area safety gates 75a–75c, 80a–80c or entry the of workers into the shuttle areas 35a–35c, the press rams of each press descend and stop 125, placing the dies associated therewith in an assembled (closed) position. Subsequently thereto, automatic clamping devices mounted to the press rams unclamp, releasing the upper half of each die from its respective press ram 130. Once the upper die halves are released, each of the press rams returns to a retracted (home) position 135.

Once each of the press rams returns to a retracted position, the press envelope safety gates 55a–55d, 60a–60d are opened 140, and the actual die transfer process is initiated 145. During the die transfer, dies 95a–95d associated with the new component to be manufactured are loaded into the respective presses 10a–10d via their rolling die bolsters 45a–45d, while the old dies 90a–90d are removed from the presses in a like manner. Due to the presence of the transfer area safety gates 75a–75c, workers may safely operate in the shuttle areas 35a–35c concurrently with the ongoing die transfer process.

Upon successful removal of the old dies 90a–90d and loading of the new dies 95a–95d, the press rams descend into contact with the upper halves of each new die 150 and the automatic clamping devices secure the upper half of each die to its respective press ram 155. Each of the press rams then returns along with a corresponding upper die half to its retracted (home) position 160. By the time the press rams have retracted and the die change is completed, conversion of the transfer equipment 40a–40c in the shuttle areas 35a–35c will also typically have been completed 165.

Once the transfer equipment conversion and die transfer/change have been completed 165, and workers have exited the shuttle areas 35a–35c, each of the press envelope safety gates 55a–55d, 60a–60d, shuttle area safety gates 65a–65c, 70a–70c, and transfer area safety gates 75a–75c, 80a–80c are returned to their normal positions 170. This process can occur simultaneously, or in any sequential order. It is preferred, however, that some form of a lockout/tagout procedure be employed so it can be ensured that at least the transfer area safety gates 75a–75c, 80a–80c cannot be returned to their normal positions while a worker remains in a shuttle area 35a–35c. Once all the safety gates have been returned to their normal positions, the changeover is complete 175, and the tandem press line can be returned to its normal operational mode 180.

The above described exemplary embodiments of a system and method of the present invention are provided for the purpose of illustration only, and are not intended to limit the scope of the invention in any way. For example, due to differences in press line design or layout, and to the particular processes performed thereby, it is possible that the actual elements of the system of the present invention may differ from that described above—in design, construction, or movement. Similarly, it is possible for the sequence of operation of the safety gates to deviate from that described above, and/or for the interlocks or other sequence guarantees to be dissimilar to that described herein. Consequently, while certain embodiments of the present invention are described in detail above, the scope of the invention is not to be considered limited by such disclosure, and modifications are possible without departing from the spirit of the invention as evidenced by the following claims:

What is claimed is:

1. A tandem press shuttle area isolation gate system, comprising:
   at least two presses arranged such that an exit side of a preceding press is adjacent to an entry side of a subsequent press, with a shuttle area therebetween;
   press envelope safety gates for preventing access to a work envelope of each press via opposing die transfer sides thereof while said presses are in operation;
   shuttle area safety gates for preventing access to shuttle areas between presses while said presses are in operation; and
   transfer area safety gates for preventing access to said work envelope of each press via said exit side or said entry side thereof while a die change is taking place, said transfer area safety gates maintained in a normally open position during press operation;
   wherein, the use of said transfer area safety gates allows workers to safely enter said shuttle areas concurrently with a die change due to the isolation of said press work envelopes from said shuttle areas.

2. The tandem press shuttle area isolation gate system of claim 1, wherein said transfer area safety gates are maintained in a normally open position that is above said exit sides and entry sides of said presses.

3. The tandem press shuttle area isolation gate system of claim 1, wherein said transfer area safety gates are maintained in a normally open position that is horizontally offset from said exit sides and entry sides of said presses.

4. The tandem press shuttle area isolation gate system of claim 1, wherein at least certain ones of said transfer area safety gates are designed to accommodate component transfer equipment when in a closed position.

5. The tandem press shuttle area isolation gate system of claim 1, wherein at least certain ones of said transfer area safety gates are comprised of more than one individual gate.

6. The tandem press shuttle area isolation gate system of claim 1, wherein operation of said transfer area safety gates is interlocked with an automatic die change control system.

7. The tandem press shuttle area isolation gate system of claim 1, further comprising a lockout means that prevents said transfer area safety gates from being returned to their normally open positions while a worker remains in one or more of said shuttle areas.

8. The tandem press shuttle area isolation gate system of claim 1, wherein said transfer area safety gates are adapted to operate as a group.

9. The tandem press shuttle area isolation gate system of claim 1, wherein said transfer area safety gates are adapted to operate independently of one another.

10. The tandem press shuttle area isolation gate system of claim 1, wherein said press envelope safety gates and said shuttle area safety gates are in a normally closed position during press operation.

11. A tandem press line shuttle area isolation gate system, comprising:
   a line of presses arranged such that an exit side of a preceding press is adjacent to an entry side of a subsequent press, with a shuttle area therebetween;
   a press envelope safety gate preventing access to a work envelope of each press along a first die transfer side thereof, said press envelope safety gate normally closed during press operation;
   a press envelope safety gate preventing access to a work envelope of each press along a second die transfer side thereof, said press envelope safety gate normally closed during press operation;
   a shuttle area safety gate preventing access to each shuttle area between adjacent presses along said first die transfer side thereof, said shuttle area safety gate normally closed during press operation;
   a shuttle area safety gate preventing access to each shuttle area between adjacent presses along said second die transfer side thereof, said shuttle area safety gate normally closed during press operation;
   a transfer area safety gate preventing access to said work envelope of each press via an associated shuttle area located along said exit side thereof, said shuttle area safety gate normally open during press operation;
   a transfer area safety gate preventing access to said work envelope of each press via an associated shuttle area located along said entry side thereof, said shuttle area safety gate normally open during press operation; and
   an automatic die change system designed to transfer new dies into said presses through one of said die transfer sides thereof while simultaneously transferring old dies out of said presses through the other of said die transfer sides thereof;
   wherein, by closing said transfer area safety gates and opening said press envelope safety gates and said shuttle area safety gates, workers can safely enter said shuttle areas concurrently with a die change due to the isolation of said press work envelopes from said shuttle areas.

12. The tandem press line shuttle area isolation gate system of claim 11, wherein each transfer area safety gate is maintained in a normally open position that is above said exit sides and entry sides of said presses.

13. The tandem press line shuttle area isolation gate system of claim 11, wherein each transfer area safety gate is maintained in a normally open position that is horizontally offset from said exit sides and entry sides of said presses.

14. The tandem press line shuttle area isolation gate system of claim 11, wherein at least one transfer area safety gate is designed to accommodate component transfer equipment when in a closed position.

15. The tandem press line shuttle area isolation gate system of claim 11, wherein at least one transfer area safety gate is comprised of more than one individual gate.

16. The tandem press line shuttle area isolation gate system of claim 11, wherein operation of each transfer area safety gate is interlocked with an automatic die change control system.

17. The tandem press line shuttle area isolation gate system of claim 11, further comprising a lockout means that prevents each transfer area safety gate from being returned to its normally open position while a worker remains in one or more of said shuttle areas.

18. The tandem press line shuttle area isolation gate system of claim 11, wherein said transfer area safety gates are adapted to operate as a group.

19. The tandem press line shuttle area isolation gate system of claim 11, wherein said transfer area safety gates are adapted to operate independently of one another.

20. A method for reducing downtime associated with a changeover of a tandem press line having a plurality of presses arranged such that an exit side of a preceding press is adjacent to an entry side of a subsequent press, with a shuttle area therebetween, said method comprising:
   providing press envelope safety gates for preventing access to a work envelope of each press via opposing die transfer sides thereof, said press envelope safety gates normally closed during press operation;
   providing shuttle area safety gates for preventing access to said shuttle areas between presses, said shuttle area safety gates normally closed during press operation;
   providing transfer area safety gates for preventing access to said work envelope of each press via said exit side or said entry side thereof, said shuttle area safety gates normally open during press operation; and
   closing said transfer area safety gates and opening said press envelope safety gates and said shuttle area safety gates during a die change;
   whereby, due to isolation of said press work envelopes from said shuttle areas by said transfer area safety gates, workers are able to safely enter said shuttle areas and convert component transfer equipment located therein concurrently with said die change.

21. The method of claim 20, wherein each transfer area safety gate is maintained in a normally open position that is above said exit sides and entry sides of said presses.

22. The method of claim 20, wherein each transfer area safety gate is maintained in a normally open position that is horizontally offset from said exit sides and entry sides of said presses.

23. The method of claim 20, wherein at least one transfer area safety gate is designed to accommodate component transfer equipment when in a closed position.

24. The method of claim 20, wherein at least one transfer area safety gate is comprised of more than one individual gate.

25. The method of claim 20, further comprising interlocking the operation of each transfer area safety gate with an automatic die change control system.

26. The method of claim 20, further comprising following a lockout procedure that prevents each transfer area safety gate from being returned to its normally open position while a worker remains in one or more of said shuttle areas.

27. The method of claim 20, wherein said transfer area safety gates are operated as a group.

28. The method of claim 20, wherein said transfer area safety gates are operated independently of one another.

29. The method of claim 20, wherein movement of dies involved in said die change is prohibited until a signal indicating transfer area safety gate closure is received.

30. The method of claim 20, wherein, during a die change, said press envelope safety and said shuttle area safety gates cannot be opened until a signal indicating transfer area safety gate closure is received.

31. The method of claim 20, further comprising a shuttle area adjacent to an entry side of a first press and/or an exit side of a last press in said tandem press line.

* * * * *